(12) United States Patent
Bruchmann et al.

(10) Patent No.: US 8,789,466 B2
(45) Date of Patent: Jul. 29, 2014

(54) METHOD FOR PRINTING SUBSTRATES

(75) Inventors: Bernd Bruchmann, Freinsheim (DE); Daniel Schoenfelder, Brussels (BE); Frank Dietsche, Schriesheim (DE); Eva Wagner, Bad Duerkheim (DE); Robert Feuerhake, Mannheim (DE); Juergen Kaczun, Wachenheim (DE)

(73) Assignee: BASF SE, Ludwigshafen (DE)

( * ) Notice: Subject to any disclaimer, the term of this patent is extended or adjusted under 35 U.S.C. 154(b) by 796 days.

(21) Appl. No.: 13/120,318

(22) PCT Filed: Sep. 28, 2009

(86) PCT No.: PCT/EP2009/062481
§ 371 (c)(1),
(2), (4) Date: Mar. 22, 2011

(87) PCT Pub. No.: WO2010/037691
PCT Pub. Date: Apr. 8, 2010

(65) Prior Publication Data
US 2011/0168045 A1    Jul. 14, 2011

(30) Foreign Application Priority Data
Oct. 2, 2008    (EP) .................................... 08165720

(51) Int. Cl.
*B41M 1/00*    (2006.01)
(52) U.S. Cl.
USPC ....................................................... 101/491
(58) Field of Classification Search
None
See application file for complete search history.

(56) References Cited

U.S. PATENT DOCUMENTS

| 2,178,173 | A | 10/1939 | Katzman et al. |
| 2,290,415 | A | 7/1942 | Groote |
| 2,407,895 | A | 9/1946 | Monson et al. |
| 4,404,362 | A | 9/1983 | Bellos |
| 4,505,839 | A | 3/1985 | Bellos et al. |
| 5,015,754 | A | 5/1991 | Dix et al. |
| 5,646,200 | A | 7/1997 | Duncan |
| 8,501,280 | B2 * | 8/2013 | Bruchmann et al. .......... 427/384 |
| 2008/0193648 | A1 | 8/2008 | Becker et al. |

FOREIGN PATENT DOCUMENTS

| CS | 265929 | 4/1990 |
| DE | 40 03 243 | 8/1991 |
| DE | 41 04 834 | 9/1991 |
| EP | 0 358 087 | 3/1990 |
| EP | 0 441 198 | 8/1991 |
| WO | 02 36695 | 5/2002 |
| WO | 02 36697 | 5/2002 |
| WO | 03 093001 | 11/2003 |
| WO | 03 093002 | 11/2003 |
| WO | 2006 108832 | 10/2006 |

OTHER PUBLICATIONS

U.S. Appl. No. 13/391,779, filed Feb. 22, 2012, Kleine Jaeger, et al.
U.S. Appl. No. 13/394,011, filed Mar. 2, 2012, Kleine Jaeger, et al.
U.S. Appl. No. 13/259,882, filed Sep. 23, 2011, Seeler, et al.
International Search Report Issued Jan. 15, 2010 in PCT/EP09/062481 filed Sep. 28, 2009.

* cited by examiner

*Primary Examiner* — Joshua D Zimmerman
(74) *Attorney, Agent, or Firm* — Oblon, Spivak, McClelland, Maier & Neustadt, L.L.P.

(57) ABSTRACT

In a method for printing substrates with a printing ink and/or a printing varnish at least comprising solvents and binders, at least one of the binders comprises a polyetheramine polyol.

15 Claims, No Drawings

METHOD FOR PRINTING SUBSTRATES

The present invention relates to a method for printing substrates with a printing ink and/or a printing varnish at least comprising solvents and binders, wherein at least one of the binders comprises a polyetheramine polyol.

In the so-called mechanical printing processes such as offset printing, letterpress printing, flexographic printing, gravure printing or screen printing, the printing ink is transferred to the printing stock through the printing stock being contacted with an inked printing form, for example a printing plate. Printing inks for these applications typically comprise solvents, colorants, binders and also various additives. Printing varnishes are applied to the printing stock either as a primer or, after printing, as a coating on the printed stock. Application is typically done in-line via a varnishing unit of the printing press. Printing varnishes are formulated similarly to printing inks except that they do not contain any colorant.

The nature of the printing stock governs the way printing inks dry and cure. In the case of printing stocks that are absorbent, the printing inks penetrate at least partly into the printing stock. In the case of printing stocks which are non-absorbent, examples being polymeric films and metal foils, the printing ink is naturally unable to penetrate into the printing stock, but forms a dried film on the printing stock after the solvent has evaporated off. Printing inks for printing stocks of this kind therefore have to have very good filming properties and also particularly good adherence in order that the printing-ink film may not become detached again from the substrate on exposure to mechanical stress. Printing inks should further have equal adherence to different substrates, for example polar polyamide or PET films and apolar polyolefin films. This is particularly important when the printing inks are to be used for producing multilayered packaging.

Multilayered materials for producing packaging, more particularly food packaging, consist for example of two or more polymeric films, for example polyolefin films, metal foils or metalized polymeric films which are bonded together by lamination and via suitable laminating adhesives for example. Polymeric films can in turn be multilayered, for example coextruded, films or else single-layered films. The laminate may additionally comprise further functional layers, for example odor barrier layers or water vapor barriers. Multilayered materials for producing packaging will typically be printed or coated. For this, the printing ink may be applied to the surface of the multilayered material, but it can also be positioned between two films and/or foils.

Printing inks comprising conventional binders are not sufficiently adherent on many printing stocks, necessitating the addition of adhesion promoters such as particular silanes or titanates. U.S. Pat. No. 5,646,200 may be referenced here by way of example. But even the use of adhesion promoters does not ensure that adherence is satisfactory on all printing stocks.

Prior art proposals to solve this problem include using hyperbranched polymers as binders in printing inks, as disclosed by WO 02/36695, WO 02/36697, WO 03/93001 and WO 03/93002 for example. The references disclose for example the use of hyperbranched polyurethanes, hyperbranched polyureas, hyperbranched polyesters, hyperbranched polyethers, hyperbranched polyamines, hyperbranched polyamides, hyperbranched polyester amides or hyperbranched polyether amides.

Polyetheramine polyols are known. They are obtained from trialkanolamines, such as triethanolamine, tripropanolamine, triisopropanolamine for example, optionally in admixture with mono- or dialkanolamines, by etherifying these monomers under catalysis, for example acidic or basic catalysis, eliminating water. The preparation of these polymers is described for example in U.S. Pat. No. 2,178,173, U.S. Pat. No. 2,290,415, U.S. Pat. No. 2,407,895 and DE 40 03 243. The polymerization can either be a random polymerization, or produce block structures from individual alkanolamines, which are linked together in a further reaction (see U.S. Pat. No. 4,404,362 for example).

The polyetheramine polyols described in the literature are used in free or quaternized form, for example, as demulsifiers for oil-water mixtures, as aftertreatments for dyed leathers (see DE 41 04 834) or as lubricants for metalworking (see CS 265929). Hitherto it is not known to use them for producing printing inks.

Our earlier application EP 07118076.4 discloses the use of polyetheramine polyols for coating substrates, for example plastic, wood, paper, textiles, leather or metals. The printing of substrates with printing inks or printing varnishes is not disclosed.

It is an object of the present invention to provide improved printing inks, more particularly improved printing inks for printing packaging.

The binder for these improved printing inks should be very water-soluble or water-dispersible, preferably have a glass transition temperature below room temperature, and good filming properties, and also be compatible with basic components, for example polyamines such as polyethyleneimine.

We have found that this object is achieved by a method for printing substrates which comprises transferring a printing ink or a printing varnish at least comprising solvents and binders to a printing form, contacting a substrate with the inked or varnished printing form and thereby transferring the printing ink or the printing varnish from the printing form to the substrate, wherein at least one of the binders comprises a polyetheramine polyol having a number average molecular weight $M_n$ in the range from 500 to 50 000 g/mol, which polyetheramine polyol in addition to ether groups and also secondary and/or tertiary amino groups incorporated in the polymer scaffold further includes at least five functional groups disposed terminally and/or laterally.

In one preferred embodiment of the invention, the polyetheramine polyol is obtainable by condensing at least one trialkanolamine of the general formula $N(R^1-OH)_3$ (Ia) and/or at least one dialkanolamine of the general formula $R^2-N(R^1-OH)_2$ (Ib) to form a polyetheramine polyol (II), wherein the $R^1$ radicals are each independently a divalent, linear or branched aliphatic hydrocarbyl radical having 2 to 6 carbon atoms, and the $R^2$ radicals are hydrogen and/or linear or branched aliphatic, cycloaliphatic and/or aromatic hydrocarbyl radicals having 1 to 30 carbon atoms.

One preferred embodiment comprises a printing ink comprising at least one colorant, preferably packaging printing inks for flexographic or gravure printing.

The invention will now be described in detail:

Description of polyetheramine polyols used

A high-functionality polyetheramine polyol for the purposes of this invention is a polymeric product comprising ether groups and secondary and/or tertiary amino groups, each incorporated in the polymer scaffold. The high-functionality polyetheramine polyols additionally include, in terminal and/or lateral disposition, at least five, preferably at least seven and more preferably at least ten functional groups. Examples of functional groups are hydroxyl and amino groups.

The functional groups in question frequently comprise OH groups. The number of terminally or laterally disposed functional groups has no upper limit in principle, but products having a very large number of functional groups can have undesired properties, for example high viscosity or poor solubility. The high-functionality polyetheramine polyols of the present invention usually have not more than 500 terminally or laterally disposed functional groups and preferably not more than 100 terminally or laterally disposed functional groups.

The polyetheramine polyols used according to the present invention are obtainable via a condensation reaction in which at least one trialkanolamine of the general formula (Ia) and/or dialkanolamine of the general formula (Ib) and also optionally further components (Ic) having at least two hydroxyl and/or amino groups and also optionally further components (Id) are reacted with one another in a polycondensation reaction to form a polyetheramine polyol (II).

The resulting polyetheramine polyol (II) can optionally be modified in a further reaction stage. For example, it can be alkoxylated or reacted with functionalizing reagents.

The trialkanolamines (Ia) and/or dialkanolamines (Ib) used for polycondensation have the general formulae $N(R^1—OH)_3$ (Ia) and $R^2—N(R^1—OH)_2$ (Ib), respectively.

The $R^1$ radicals each comprise independently a divalent, linear or branched aliphatic hydrocarbyl radical having 2 to 6 carbon atoms, preferably 2 or 3 carbon atoms. Examples of such radicals comprise ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl, butane-2,3-diyl, 2-methylbutane-1,3-diyl, 3-methylbutane-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl. Preference is given to ethane-1,2-diyl, propane-1,3-diyl and propane-1,2-diyl.

The $R^2$ radical comprises hydrogen and/or linear or branched aliphatic, cycloaliphatic and/or aromatic hydrocarbyl radicals having 1 to 30 carbon atoms, preferably 1 to 20 carbon atoms and more preferably 1 to 10 carbon atoms. It will be appreciated that aromatic radicals can also have aliphatic substituents. R2 is preferably hydrogen or an aliphatic hydrocarbyl radical having 1 to 4 carbon atoms.

Examples of preferred trialkanolamines (Ia) comprise triethanolamine, triisopropanolamine and tributan-2-olamine or mixtures thereof, particular preference being given to triethanolamine and triisopropanolamine and also mixtures thereof.

Examples of preferred dialkanolamines (Ib) comprise diethanolamine, dipropanolamine, diisopropanolamine, dibutanolamine, N-methyldiethanolamine, N-methyldipropanolamine, N-methyldiisopropanolamine, N, N-bis(2-hydroxypropyl)-N-methylamine, N,N-bis(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine or N,N-bis(2-hydroxyethyl) aniline. Particular preference is given to diethanolamine, N-methyldiethanolamine, dipropanolamine, N-methyldipropanolamine, diisopropanolamine and N-methyldiisopropanolamine.

In addition to the trialkanolamines (Ia) and/or dialkanolamines (Ib), it is optionally possible to use further components (Ic), having at least two hydroxyl and/or amino groups, for the polycondensation.

In one preferred embodiment, the components (Ic) comprise polyols of the general formula $R^3(OH)_n$, where n is a natural number from 2 to 4 and $R^3$ is an n-valent linear or branched aliphatic, cycloaliphatic or aromatic hydrocarbyl radical having 2 to 10 carbon atoms.

Examples of polyols of this type comprise aliphatic polyols such as ethylene glycol, propylene glycol, butylene glycol, glycerol, tri(hydroxymethyl)ethane, tri(hydroxymethyl)propane, sorbitol, neopentyl glycol or pentaerythritol, cycloaliphatic polyols such as 1,4-dihydroxycyclohexane or arylaliphatic polyols such as 1,4-bis-(hydroxymethyl)benzene. Glycerol is preferred.

In one further preferred embodiment, the components (Ic) comprise polyamines of the general formula $R^4(NHR_5)_m$, where m is a natural number from 2 to 4, $R^4$ is an m-valent linear or branched aliphatic, cycloaliphatic or aromatic hydrocarbyl radical having 2 to 10 carbon atoms and the $R^5$ radicals are independently H, an $R^2$ hydrocarbyl radical, in which case it is further possible for two R5 radicals to combine to form an alkylene group, preferably a linear 1,ω-alkylene group having 2 to 6 carbon atoms. $R^5$ is preferably H or methyl.

Examples of such polyamines comprise ethylenediamine, N,N'-dimethylethylene-diamine, N,N'-diethylethylenediamine, 1,2-diaminopropane, 1,3-diaminopropane, 1,6-diaminohexane, 1,2-diaminocyclohexane, 1,3-diaminocyclohexane, 1,4-diaminocyclohexane or piperazine.

If present, components (Ic), which have at least two hydroxyl and/or amino groups, are preferably used in an amount of not more than 50 mol %, based on the total amount of all components used for condensation, i.e., (Ia) and/or (Ib), (Ic) and also, optionally, (Id).

In addition to the components (Ia) and/or (Ib) and also optionally (Ic), it is optionally possible to use still further components (Id) for condensation that differ from (Ia), (Ib) or (Ic). In principle, any mono- or polyfunctional compound having functional groups capable of reacting with trialkanolamines (Ia) and/or dialkanolamines (Ib) in a condensation reaction can be concerned. The term "condensation" herein shall be understood in the usual manner as referring to a reaction in which two functional groups form a covalent bond by elimination of a small molecule, such as water in particular. Examples of compounds (Id) comprise carboxylic acids, more particularly dicarboxylic acids, capable of forming ester groups with the trialkanolamines (Ia) and/or dialkanolamines (Ib). Such further components can be used to fine-tune the properties of the alkoxylated polyalkanolamines used according to the present invention. However, the quantity of such further compounds (Ib) should generally not exceed 5% by weight, based on the amount of (Ia), (Ib), (Ic) and also (Id). The quantity preferably amounts to less than 1% by weight and more preferably less than 0.5% by weight, and it is very particularly preferable to use no further components (Id) for condensation.

The polycondensation of components (Ia) and/or (Ib) and also optionally (Ic) and/or (Id) can be carried out according to methods known in principle to a person skilled in the art, by heating the components to eliminate water. Suitable methods are disclosed by EP 441 198 A2 for example. It will be appreciated that mixtures of two or more different components (Ia), (Ib), (Ic) or (Id) can also be used in each case.

The reaction can be carried out without a solvent or else in a suitable solvent. When the reaction is carried out in a solvent, it is sensible to use a solvent which can later serve as a solvent in the printing inks. Preferably, the reaction is carried out without a solvent.

The temperature at which the condensation is carried out is typically in the range from 120 to 280° C., preferably in the range from 150 to 260° C. and more preferably in the range from 180 to 240° C. The water formed is preferably removed by a distillation. The reaction time is typically in the range from 1 to 16 h and preferably in the range from 2 to 8 h. The degree of condensation can be policed in a simple manner via the reaction temperature and time.

The polycondensation is preferably carried out in the presence of an acid, preferably phosphorous acid (H3PO$_3$) and/or hypophosphorous acid (H3PO$_2$). Preferred amounts range from 0.05% to 2% by weight and preferably from 0.1% to 1% by weight, based on the components to be condensed. Additional catalysts can be used as well as the acid, examples being zinc halides or aluminum sulfate, optionally in admixture with acetic acid, as disclosed by U.S. Pat. No. 4,505,839 for example.

The viscosity of the resulting polyetheramine polyols (II) is typically in the range from 1000 to 50 000 mPa·s, preferably in the range from 2000 to 20 000 mPa·s and more preferably in the range from 3000 to 10 000 mPa·s (all measured on neat product at 20-60° C.).

The weight average molecular weight $M_w$, is generally 1000 and 500 000 g/mol, preferably in the range from 2000 to 300 000 g/mol and more particularly in the range from 5000 to 300 000 g/mol.

The number average molecular weight $M_n$ is 500 and 50 000 g/mol and preferably in the range from 1000 to 40 000 g/mol, measured via gel permeation chromatography using hexafluoroisopropanol as mobile phase and polymethyl methacrylate (PMMA) as standard.

The OH number is mostly 100 mg KOH/g or more, preferably 150 mg KOH/g or more.

The aforementioned settings for the reaction conditions and, where applicable, the choice of suitable solvent ensure that the as-synthesized products according to the present invention can be further processed without further purification.

If required, the reaction mixture can be decolorized, for example by treatment with activated carbon or metal oxides, for example aluminum oxide, silicon oxide, magnesium oxide, zirconium oxide, boron oxide or mixtures thereof, in amounts of for example 0.1% to 50% by weight, preferably 0.5% to 25% by weight and more preferably 1% to 10% by weight at temperatures of for example 10 to 100° C., preferably 20 to 80° C. and more preferably 30 to 60° C.

Optionally, the reaction mixture can also be filtered to remove any precipitates present. Frequently, the product is stripped to free it of low molecular weight, volatile compounds. To this end, after the desired degree of conversion is reached, the catalyst is optionally deactivated and the low molecular weight volatiles, for example water, the starting amino alcohols or volatile oligomeric or cyclic compounds can be removed by distillation, optionally by introduction of a gas, preferably nitrogen, or noble gases, optionally at reduced pressure.

Modified Polyetheramine Polyols

The unmodified polyetheramine polyols (II) obtained as described can optionally be modified in further reaction steps. The products of these further reaction steps are modified polyetheramine polyols which include other functional groups than in the original polyetheramine polyol (II). The terminally or laterally disposed OH groups and also any amino groups present react with suitable functionalizing reagents in the course of the modifying reaction steps. The properties of the polyetheramine polyols can thereby be changed and adapted to a desired purpose.

For example, the unmodified polyether amines can be alkoxylated in a manner known in principle.

$C_2$- to $C_{12}$-Alkylene oxides can be used for this purpose. Ethylene oxide and/or propylene oxide are preferably used. Higher alkylene oxides are generally at best only used in small amounts to fine-tune properties. In general, the amount of ethylene oxide and/or propylene oxide is at least 80% by weight, preferably 95% by weight and more preferably 95% by weight, based on the sum total of all the alkylene oxides used.

The average degree of alkoxylation can be for example in the range from 1 to 100 and preferably in the range from 5 to 50 alkylene units per OH group and—if present—per secondary amino group in the starting material of the alkoxylation, i.e., the polyetheramine polyol (II).

In one further embodiment of the invention, the unmodified polyetheramine polyols (II) can optionally also be functionalized in a further reaction step. For this purpose, the hydroxyl groups and/or amino groups present in the polyetheramine polyols (II) can be converted using suitable reagents capable of reacting with hydroxyl groups and/or amino groups.

For example, the tertiary amino groups present can be protonated or they can be quaternized using suitable alkylating reagents.

The terminal or lateral hydroxyl groups can be reacted with suitable reagents for derivatization. Depending on the functionalizing reagent, the chain end can be rendered hydrophobic or more hydrophilic.

The hydroxyl groups can be for example esterified with sulfuric acid or derivatives thereof to form products having sulfate groups. Phosphoric acid, phosphorous acid, polyphosphoric acid, POCl$_3$ or P$_4$O$_{10}$ can be used in a similar manner to obtain products comprising phosphorus-containing groups.

The hydroxyl groups can also be esterified with carboxylic acids. Monocarboxylic acids such as dodecanoic acid, hexadecanoic acid, octadecanoic acid or 9-dodecenoic acid for example can be used for esterification. Ethylenically unsaturated carboxylic acids, such as (meth)acrylic acid for example, are also particularly useful for esterification. The products obtained in this case are polymers having terminally or laterally disposed crosslinkable groups. The hydroxyl groups can further be etherified for example.

Printing Inks

In accordance with the present invention, the polyetheramine polyols are used for producing printing inks and/or printing varnishes.

The printing ink can in principle be any printing ink for mechanical printing processes, i.e., processes wherein the printing ink comes into contact with the printing stock via a printing form. Examples comprise printing inks for offset printing, letterpress printing, flexographic printing, gravure printing or screen printing. The term "printing ink" shall comprise printing varnishes also. The printing form may comprise for example printing plates or round printing forms also known as sleeves.

Printing inks comprise, as will be known in principle, at least one solvent, at least one colorant, at least one binder and also, optionally, further additives. In accordance with the present invention, at least one of the binders comprises a polyetheramine polyol. The polyetheramine polyol in question may comprise unmodified polyetheramine polyols (II) or else modified polyetheramine polyols. Unmodified polyetheramine polyols are preferably used. It will be appreciated that a mixture of two or more different polyetheramine polyols can also be used. In addition to the at least one polyether polyamine polyol, still further binders can be used, as will be appreciated. In general, the ratio of the amounts of the polyetheramine polyols to the total amount of all the binders used is in the range from 0.1 to 1, preferably in the range from 0.3 to 1, more preferably in the range from 0.4 to 1, most preferably in the range from 0.5 to 1 and, for example, in the range from 0.7 to 1. In one further embodiment of the invention, the binders used are exclusively polyetheramine polyols.

Printing inks preferably comprise flexographic, gravure or screen printing inks and more preferably packaging printing inks for flexographic printing or gravure printing. The term "packaging printing inks" is self-explanatory and also limiting. Packaging printing inks comprise thinly liquid, fast-drying printing inks. They correspondingly comprise relatively low-boiling solvents, the boiling point of which is generally not more than 140° C. Screen printing inks have similar formulations to flexographic or gravure printing inks, although they are somewhat more viscous, and typically include solvents having somewhat higher boiling points.

Examples of further binders for packaging printing inks comprise polyvinyl butyral, nitrocellulose, polyamides, polyacrylates or polyacrylate copolymers. The combination of the polyetheramine polyols with nitrocellulose will prove particularly advantageous.

The total amount of all binders in the printing ink, particularly the packaging printing ink is typically 5-35% by weight, preferably 6-30% by weight and more preferably 10-25% by weight, based on the sum total of all constituents. The ratio of the amounts of polyetheramine polyols to the total amount of all binders is typically between 0.3 to 1, preferably in the range from 0.4 to 1, with the proviso that the amount of polyetheramine polyols should generally not be less than 3% by weight, preferably 4% by weight and more preferably 5% by weight, based on the sum total of all constituents in the printing ink.

A single solvent can be used or else a mixture of two or more solvents. Useful solvents include in principle the customary solvents for packaging printing inks. Particularly useful solvents for the printing inks used according to the present invention are alcohols such as for example ethanol, 1-propanol, 2-propanol, ethylene glycol, propylene glycol, diethylene glycol, substituted alcohols such as for example ethoxypropanol, esters such as for example ethyl acetate, isopropyl acetate, n-propyl or n-butyl acetate. Water is also useful in principle as a solvent. Ethanol and mixtures consisting predominantly of ethanol are particularly preferred as solvents. From the solvents which are possible in principle, a person skilled in the art will make an appropriate selection in accordance with the solubility characteristics of the polyurea and the properties desired for the printing ink. Solvent is typically used at 40% to 80% by weight, based on the sum total of all the constituents in the printing ink.

As colorants it is possible to use customary dyes and more particularly customary pigments. Examples are inorganic pigments such as for example titanium dioxide pigments or iron oxide pigments, interference pigments, carbon blacks, metal powders such as more particularly aluminum, brass or copper powder, and also organic pigments such as azo, phthalocyanine or isoindoline pigments. It will be appreciated that mixtures of various dyes or colorants can also be used, and also soluble organic dyes. Colorant is typically used at 5% to 25% by weight, based on the sum total of all constituents.

The printing inks, more particularly the packaging printing inks, comprising polyetheramine polyols may optionally comprise further additives and auxiliaries. Examples of additives and auxiliaries are fillers such as calcium carbonate, aluminum oxide hydrate or aluminum and/or magnesium silicate. Waxes enhance rub-off resistance and slip. Examples are, in particular, polyethylene waxes, oxidized polyethylene waxes, petroleum waxes or ceresin waxes. Fatty acid amides can be used to enhance surface smoothness. Plasticizers serve to enhance the elasticity of the dried film of printing ink or varnish. Examples are phthalic esters such as dibutyl phthalate, diisobutyl phthalate, dioctyl phthalate, citric esters or esters of adipic acid. Dispersing assistants can be used to disperse the pigments. The printing ink of the present invention can advantageously omit adhesion promoters, although this shall not exclude the use of adhesion promoters. The total amount of all additives and auxiliaries typically does not exceed 20% by weight, based on the sum total of all constituents in the printing ink, and is preferably 0-10% by weight.

It will be appreciated that UV-curable printing inks can be used, in which case binders having UV-curable groups, for example acrylate groups, are used. Binders of this type may comprise for example modified polyetheramine polyols which have crosslinkable groups. Polyetheramine polyols having crosslinkable groups are obtainable for example by partial esterification with methacrylic acid of terminally or laterally disposed OH groups of unmodified polyetheramine polyols. However, it is also possible to use polyetheramine polyols without crosslinking groups in admixture with other binders with crosslinking groups.

The solvents used in UV-crosslinkable printing inks are typically reactive diluents, for example acrylates such as n-butyl acrylate or 2-ethylhexyl acrylate or vinyl ethers such as for example ethyl vinyl ether or n-butyl vinyl ether.

The printing ink is obtainable in a manner known in principle, by intensively mixing/dispersing the constituents in customary apparatus such as dissolvers, stirred ball mills or a three-roll mill for example. Advantageously, a concentrated pigment dispersion is prepared first using a proportion of the components and a portion of the solvent, and later further processed with further constituents and further solvent to form the final printing ink.

Printing varnishes are used for coating prints, and are applied using specific printing plates, so-called varnish plates, in contrast to other varnishes. Printing varnishes naturally do not contain any colorants, but otherwise have the same constituents as the printing inks described above. The amounts of the other components increase accordingly. The total amount of all solvents in a printing varnish used according to the present invention is typically in the range from 40% to 90% by weight, and the total amount of all binders is typically 5-40% by weight, preferably 6-35% by weight and more preferably 10-30% by weight, based on the sum total of all constituents. The ratio of amounts of polyetheramine polyols to the total amount of all binders is typically between 0.3 to 1, preferably in the range from 0.4 to 1, with the proviso that the amount of polyetheramine polyols should generally not exceed 3% by weight, preferably 4% by weight and more preferably 5% by weight, based on the sum total of all constituents in the printing varnish.

Printing Process

The printing inks and varnishes comprising polyetheramine polyols can be used for printing substrates, also known as printing stocks, of any kind, for example paper, cardboard, metal foils or polymeric films. They may preferably be used for printing metal foil and polymeric film.

Examples are polyolefin films such as films of polyethylene, polypropylene or poly(4-methyl-1-pentene) or polystyrene. Polyethylene films may comprise films of HDPE, LDPE or LLDPE. Other possibilities are copolymers such as for example films of ethylene-vinyl acetate copolymers, ethylene-acrylic acid copolymers or styrene-butadiene copolymers. Films of PVC or polycarbonates can also be used. Films of polar materials can also be used, examples being cellophane films, polyester films, for example those of polyethylene terephthalate, polybutylene terephthalate or polyethylene naphthalate, or polyamide films, for example films of PA 6, PA 12, PA 6/66, PA 6/12 or PA 11.

The printing stocks preferably comprise films of polyethylene, polypropylene, polystyrene, polyester or polyamide and very particularly preferably PET, PEN or polyamide films.

Useful metal foils are, in particular, aluminum foils, but it is also possible to use tin foils, titanium foils, copper foils or gold foils.

The printing inks comprising polyetheramine polyols can be printed in a conventional manner. Customary printing forms can be used for this purpose, in particular customary flexographic printing forms, gravure printing forms or screen printing forms, and also the corresponding printing presses.

The method which the present invention provides for printing substrates comprises a first step of applying the printing ink to the printing form used. This is typically done by a suitable inking unit in the printing press. A person skilled in the art will be familiar with suitable inking units and their use. Thereafter, the printing form is brought into contact with the printing stock, i.e., the substrate to be printed, and the printing ink thereby transfers from the printing form to the substrate.

The prints are dried in a conventional manner by evaporating off the solvent or, in the case of radiation-curable printing inks, via appropriate radiation.

The substrates can be printed in multiple inking units in succession in a manner known in principle to produce multicolored prints. The prints obtained can likewise be coated with a varnish after printing again in a known manner. The varnish in question may advantageously comprise a varnish which likewise comprises a polyetheramine polyol as a binder component. The varnish may comprise more particularly a printing varnish, more particularly the abovementioned printing varnishes comprising polyetheramine polyols. Printing varnishes may preferably be applied via a varnishing unit; it will be appreciated, however, that other methods of application are also conceivable.

The print layers obtained with the printing inks comprising polyetheramine polyols have excellent adherence to polar and apolar substrates alike. In addition, however, the polyether amines also act as rheological modifiers.

The examples which follow illustrate the invention:

EXAMPLE 1

Preparing a Hyperbranched Polyetheramine Polyol

A 4 L HWS vessel equipped with stirrer, internal thermometer, nitrogen inlet tube and descending condenser with collecting vessel was initially charged with 2800.0 g of triethanolamine and 18.8 g of hypophosphorous acid (50% in water) as catalyst. Under stirring and slow nitrogen, the mixture was gradually heated to 230° C. and maintained under these conditions for 6 h during which an aqueous distillate passed over in admixture with low molecular weight nitrogen-containing compounds. After 412 g of distillate had separated off, the reaction mixture was cooled down to 140° C. and freed of volatiles at 140° C. by applying a 50 mbar vacuum for 10 min.

The polymer to be used according to the present invention was obtained in the form of a dark yellow viscous liquid.

The polyetheramine polyol was analyzed by gel permeation chromatography using a refractometer as detector. Hexafluoroisopropanol (HFIP) was used as mobile phase, and polymethyl methacrylate (PMMA) is used as standard for the molecular weight determination.

Mn=5500 g/mol; Mw=26 000 g/mol.

The OH number, measured according to DIN 53240 Part 2, was found to be 416 mg of KOH/g of polymer.

EXAMPLE 2

Polyvinyl Butyral Printing Ink With Hyperbranched Polyetheramine Polyol As Additive Starting Materials:
Printing Ink:
The starting material used for the test was a commercially available liquid printing ink based on polyvinyl butyral for flexographic or gravure printing (Multilam® PA-O, from Flint).
Additives:
Additive 1: commercially available polyethyleneimine (Lupasol® WF BASF SE, 50% in ethanol),
Additive 2: polyether amine as per example 1 (50% in ethanol)
Producing the Printing Inks:
The PVB printing ink was diluted with anhydrous ethanol in a ratio of 1:4. The following samples were prepared on the basis of this mixture:
P1=printing ink solution additized with 3% by weight of additive 1
P2=printing ink solution additized with 3% by weight of additive 2
Viscosity Tests:
The influence of additives 1 and 2 on printing ink viscosity was determined.

Viscosity is tracked using a Brookfield viscometer in line with DIN 53018. The investigations were carried out at RT. The viscosities of the freshly prepared printing ink samples P1 and P2 were determined directly after preparation. A further viscosity measurement is carried out after three days' storage at RT.
Results:

|  | Brookfield viscosity [mPas]* | |
| --- | --- | --- |
|  | t = 0 | t = 3 d |
| printing ink P1 | 75 | 436 |
| printing ink P2 | 47 | 225 |

We claim:
1. A method for printing a substrate, comprising:
transferring a printing ink or a printing varnish comprising at least one solvent and at least one binder to a printing form to form a inked printing form or a varnished printing form,
contacting a substrate with the inked printing form or the varnished printing form and thereby transferring the printing ink or the printing varnish from the printing form to the substrate,
wherein
the at least one binder comprises a polyetheramine polyol having a number average molecular weight $M_n$ in a range from 500 to 50 000 g/mol,
said polyetheramine polyol comprises
at least one ether group and
at least one of
at least one secondary amino group and
at least one tertiary amino group,
wherein the at least one secondary amino group and the at least one tertiary amino group are incorpo- rated in a polymer scaffold comprising at least five functional groups disposed terminally, laterally, or both terminally and laterally.

2. The method according to claim 1, wherein
the polyetheramine polyol is obtained by condensing at least one of
at least one trialkanolamine of formula $N(R^1—OH)_3$ (Ia) and
at least one dialkanolamine of formula $R^2—N(R^1—OH)$, (Ib),
wherein
the $R^1$ radicals of the formula (Ia) and the formula (Ib) are each independently
a divalent radical having 2 to 6 carbon atoms,
a linear radical having 2 to 6 carbon atoms, or
a branched aliphatic hydrocarbyl radical having 2 to 6 carbon atoms, and
the $R^2$ is one selected from the group consisting of
a hydrogen,
a linear aliphatic radical having 1 to 30 carbon atoms,
a branched aliphatic radical having 1 to 30 carbon atoms,
a cycloaliphatic radical having 1 to 30 carbon atoms, and
an aromatic hydrocarbyl radical having 1 to 30 carbon atoms.

3. The method according to claim 2, wherein the trialkanolamine comprises one compound selected from the group consisting of triethanolamine, triisopropanolamine and tributan-2-olamine.

4. The method according to claim 2, wherein the condensation is conducted under acidic or basic catalysis at a temperature in a range from 150 to 300° C.

5. The method according to claim 1, wherein a ratio of an amount of the polyetheramine polyol to a total amount of the at least one binder is in a range from 0.1 to 1.

6. The method according to claim 1, wherein the printing ink further comprises at least one colorant.

7. The method according to claim 6, wherein the printing ink comprises at least one ink selected from the group consisting of a flexographic ink, a gravure ink, and a screen printing ink.

8. The method according to claim 6, wherein the printing ink comprises at least one packaging printing ink for flexographic or gravure printing.

9. The method according to claim 8, wherein the packaging printing ink comprises
40% to 80% by weight of solvent relative to a total weight of the packaging printing ink,
5% to 35% by weight of binder relative to the total weight of the packaging printing ink, and
5% to 25% by weight of colorant relative to the total weight of the packaging printing ink,
wherein the ratio of the amount of the polyetheramine polyol to the total amount of the at least one binder is in the range from 0.3 to 1, with the proviso that at least 3% by weight of at least one of the polyetheramine polyol relative to the sum total weight of the packaging printing ink is present.

10. The method according to claim 1, wherein the substrate comprises a polymeric film or a metal foil.

11. The method according to claim 1, wherein the substrate comprises a polyethylene film, a polypropylene film, a polyester film or a polyamide film.

12. The method according to claim 1, wherein the $R^1$ radicals of the formula (Ia) and the formula (Ib) are each independently
a divalent radical having 2 or 3 carbon atoms,
a linear radical having 2 or 3 carbon atoms, or
a branched aliphatic hydrocarbyl radical having 2 or 3 carbon atoms.

13. The method according to claim 1, wherein the $R^2$ is one selected from the group consisting of
a hydrogen,
a linear aliphatic radical having 1 to 20 carbon atoms,
a branched aliphatic radical having 1 to 20 carbon atoms,
a cycloaliphatic radical having 1 to 20 carbon atoms, and
an aromatic hydrocarbyl radical having 1 to 20 carbon atoms.

14. The method according to claim 1, wherein the $R^2$ is one selected from the group consisting of
a hydrogen,
a linear aliphatic radical having 1 to 10 carbon atoms,
a branched aliphatic radical having 1 to 10 carbon atoms,
a cycloaliphatic radical having 1 to 10 carbon atoms, and
an aromatic hydrocarbyl radical having 1 to 10 carbon atoms.

15. The method according to claim 1, wherein $R^2$ is a hydrogen or an aliphatic hydrocarbyl radical having 1 to 4 carbon atoms.

* * * * *